United States Patent Office 2,903,347
Patented Sept. 8, 1959

2,903,347

DEFOLIATION OF PLANTS

Loyd Q. Boyd, Highland, Ind., assignor to Standard Oil Company, Chicago, Ill., a corporation of Indiana No Drawing. Application September 16, 1954
Serial No. 456,605

3 Claims. (Cl. 71—2.7)

This invention relates to an improved method and means for defoliating plants, and it pertains more particularly to compositions and their method of application to growing plants to cause defoliation of the plant.

An object of this invention is to defoliate or hasten the defoliation of plants, especially those crop-bearing plants which defoliate naturally. Another object is to hasten the maturing of growing crop bearing plants and thereby improve the grade and/or yield of the crop. A further object is to minimize damage to the crop from plant diseases, insects, or the like, either by killing the disease or insect or by removing its food supply. An important object of this invention is to provide an efficient and economical method and means for defoliating growing crop-bearing plants without killing them whereby an improved grade and yield of the crop can be more economically harvested.

The defoliation of plants when they are nearing or at maturity has many advantages. Using cotton plants as an example, defoliation will expose the lower cotton bolls to sunlight for ripening purposes and thereby improve the quality and yield of the cotton crop. Other crop-bearing plants having luxuriant foliage which renders the fruit crop inaccessible to sunlight for ripening purposes are those such as soy beans, lima beans, tomatoes, fruit trees such as citrus fruit trees, apple trees, and the like. The harvesting of the crop is greatly facilitated whether by hand picking or machine picking. Considerable time may be spent in hand picking cotton by looking for the open bolls which are hidden by the foliage. Defoliation renders the bolls readily discernable and facilitates rapid picking. In machine picking cotton, the open bolls are stripped from the plant and if there are dried leaves on the plant, the product is littered with what is commonly called "trash." Green leaves are crushed and cause staining of the cotton and thereby lowers its quality since the stain is exceedingly difficult if not impossible to remove. By removing the leaves the boll weevil, fall aphids, and leaf-worms are destroyed or deprived of their food supply and caused to starve or leave the area. This enables improved yields of cotton in subsequent plantings. Boll rot is reduced because the green cotton bolls are died more rapidly. These and similar advantages accrue also when defoliating other plants in addition to those mentioned herein.

It has been discovered that thiocyano esters and ethers of types previously known in the art as insecticides and selective crab grass destroyers are surprisingly effective for defoliating plants when applied to the plant leaves. These thiocyano esters and ethers may be applied either in an oil medium or an aqueous medium. The oil may be a hydrocarbon oil such as a mineral oil fraction boiling in the range of about 200° to 700° F. When defoliating cotton plants, an oil which does not stain the cotton should be used. Petroleum distillates boiling in the range of about 300° to 500° F., e.g. a refined oil having an unsulfonatable residue of more than 80%, have this quality. When employed in the hydrocarbon oil, the thiocyano ester or ether should be applied to the plants in amounts of about 0.001 to 2 gallons per acre. The hydrocarbon oil carrier may be applied in an amount between 1 to 30 gallons per acre. For example, a solution of 2% by volume of the thiocyano ester and/or ether in a mineral oil may be applied at the rate of about 20 gallons per acre. When employed in an aqueous medium, the thiocyano esters and/or ethers are preferably emulsified in water and applied to the plants in the somewhat greater amounts of 0.01 to 5 gallons of the thiocyano ester or ether per acre. The aqueous emulsion may be applied at the rate of about 1 to 100 gallons of emulsion per acre of plants. For example, an emulsion of the thiocyano compound in a concentration of about 5% by volume in water may be sprayed upon the leaves at a rate of about 30 gallons of emulsion per acre.

The thiocyano ethers which have been found to be most effective are such compounds as beta-butoxy-beta'-thiocyanodiethyl ether $$(C_4H_9OCH_2CH_2OCH_2CH_2SCN)$$

beta-beta'-dithiocyanodiethyl ether $$(NCSCH_2CH_2OCH_2CH_2SCN)$$

and the like, which are well-known insecticides. Examples of thiocyano esters are isobornyl-thiocyano acetate, fenchyl-thiocyano acetate and aliphatic and cycloaliphatic esters of omega-thiocyanoalkanoic acids, in particular, such esters of beta-thiocyanoacetic acid containing up to 10 to 18 carbon atoms per molecule. While a number of thiocyano esters and ethers falling within the latter stated chemical class are not employed as insecticides because they are skin irritants, they may, however, be employed in defoliating plants. The thiocyano esters and/or ethers are applied to the leaves of the plant in an amount ranging between about 0.001 to 5 gallons per acre. The particular amount used will vary within this range and will depend to some extent upon the liquid carrier in which it is employed, the maturity of the plant, the types of plants to be defoliated, general atmospheric conditions and other factors. When the thiocyano ester or ether is applied in a hydrocarbon oil carrier to the plant leaves, it may be employed in amounts of 0.001 to 2 gallons of the thiocyano ester or ether per acre. When the thiocyano compound is applied in an aqueous medium, somewhat greater amounts must be used, e.g. 0.01 to 5 gallons of the thiocyano ester or ether per acre. It is preferred to apply the thiocyano ester or ether to the plant leaves when the plant is approximately mature. If the thiocyano compound is applied to the plant leaves before the plant reaches maturity, a lesser degree of defoliation occurs.

When the liquid carrier for the thiocyano ester or ether is a hydrocarbon oil, the oil is applied to the plants in an amount of from about 1 to 30 gallons of oil (containing the thiocyano compound) per acre. The amount of oil to be used will vary depending upon the effectiveness of the manner in which it is sprayed upon the plants. It may be applied from the ground or by airplane. When applied from the air, lesser amounts are generally employed since more effective contacting is obtained. For example, about 2 to 10 gallons of the oil per acre of plants would be used when applying from the air whereas about 20 gallons of oil per acre would be a suitable amount when applied by ground spraying rigs. The hydrocarbon oil employed as the liquid carrier is suitably a petroleum distillate boiling in the range of about 200° to about 700° F. A preferred mineral oil fraction is a petroleum distillate boiling in the range of about 300° to 500° F. Although petroleum distillates having an end boiling point as high as about 700° F. may suitably be applied in the defoliation of plants such as soy beans, potatoes, tomatoes and the like, the use of these higher end boiling point distillates causes staining of cotton when such fractions are applied to cotton plants. It has been found that petroleum distillates boiling within the range of 300° to 500° F. do not have this deleterious quality of staining cotton. Such fractions are a preferred liquid carrier for the thiocyano ester and/or ether in defoliating cotton plants. Examples of such oils are kerosene, heavy naphtha, heavy alkylate, refined oils having an unsulfonatable residue (aromatics and unsaturates) or more than about 80%, and the like. It is preferred to use such oils as the liquid carrier in the defoliation of all plants.

When the thiocyano ester or ether is applied to the plant leaves in an aqueous medium, the aqueous medium may be applied thereto at the rate of about 1 to 100 gallons per acre of plants, e.g. about 30 gallons of the aqueous medium containing the thiocyanate compound per acre. The thiocyano compound may be contained in the aqueous medium in the form of an emulsion. Conventional emulsifying agents of the anionic, cationic, or nonionic type may be used in making the emulsion. For example, alkyl aryl polyether alcohols (Triton X–100 and Triton X–45), polyoxyethylene sorbitol oleate and/or laurate, alkali metal salts of alkyl aryl sulfonates, and the like may suitably be employed. The emulsion may be formed by agitating the thiocyanate compound with the desired amount of water in the presence of a sufficient quantity of the emulsifying agent, e.g. about 1 to 10% based upon the thiocyano ester or ether.

A number of experiments were conducted to demonstrate the effectiveness of this method of defoliating plants. In these experiments a thiocyano ester and a thiocyano ether contained in a petroleum distillate carrier were individually tested to demonstrate their effectiveness for killing the leaves of cotton and soy bean plants and causing defoliation thereof. The superiority of this method of defoliation over that obtainable with commercially available compounds and methods and also over that obtainable with the petroleum distillate alone, was also demonstrated in these experiments. The cotton plants, variety Deltapine Number 15, were started in the green house and transplanted into an experimental garden and allowed to grow until the plants had almost reached maturity. At that time (mid September in a temperate zone) the cotton plants had about 50 to 75 fairly mature cotton bolls and some immature cotton bolls. The soy beans, variety Hawkeye, were planted directly in the field. At the time these experiments were conducted the soy bean plants had not yet reached maturity. The thiocyano ester employed was isobornyl thiocyanoacetate, and the thiocyano ether used was beta-butoxy-beta'-thiocyanodiethyl ether. The base oil employed in these tests was a mixture of cracked oils having an initial boiling point of 428° F., a 10% point of 454° F., a 50% point of 483° F., a 90% point of 530° F., and an end point of 595° F. The base oil, in experiments with and without the thiocyano compound, was in all cases applied at the rate of 20 gallons per acre in a single application. In the experiments where the thiocyano ester or ether were employed in the base oil, they were contained therein in concentrations of 4.1% by volume and 2.5% by volume, respectively. Each treating composition was applied to one cotton plant by spraying the cotton plant using a compressed air sprayer with a Peet-Grady nozzle. While spraying, three sides of the cotton plant were shielded four feet up from the ground to eliminate drift to adjacent plants. In the tests performed on the soy bean plants, fifteen foot sections of a row of soy bean plants were treated with each of the treating compositions. The commercial compound used was Aero Cyanamide dust which was applied to the foliage at the prescribed rate of 30 pounds per acre from a dusting can. A careful check was made of the condition of the leaves of the cotton plants and soy bean plants six days after treatment to determine the percentage of leaves which had been killed, and also ten days after treatment to ascertain the percentage of leaves which had dropped from the plant. The results of these experiments are set forth in Table I which follows.

Table 1

| Experiment No. | Treatment | Am't thiocyano compound, gal./acre | Cotton | | Soybeans | |
|---|---|---|---|---|---|---|
| | | | Percent Leaf Kill [1] | Percent Leaf Drop [2] | Percent Leaf Kill [1] | Percent Leaf Drop [2] |
| 1 | Base Oil | none | 40 | 0 | 70 | 5 |
| 2 | Base Oil+thiocyano ester. | 0.82 | 95 | 85 | 100 | 5 |
| 3 | Base Oil [3]+thiocyano ether. | 0.50 | 98 | 90 | 98 | 5 |
| 4 | Commercial Compound. | | 60 | 75 | 90 | 25 |

[1] Percentage leaf kill was determined 6 days after treatment.
[2] Percentage leaf drop was determined 10 days after treatment.
[3] Base oil contained 1% of an emulsifier.

From the results shown in the above table, it can be observed that the thiocyano esters and ethers are remarkably more effective for killing the leaves of cotton and causing them to drop from the plants than is the commercially available compound. The data show, with respect to cotton plants, that about 0.5 gallon per acre of the thiocyano ester caused necrosis of 98% of the cotton plant leaves whereas the commercial compound caused only 60% necrosis of the leaves, and the base oil alone caused only 40% leaf necrosis. Excellent results with respect to leaf necrosis of cotton plants was also obtained when using the thiocyano ester. Whereas the base oil caused no leaf drop, and the commercially available Aero Cyanamide dust caused only 75% leaf drop, the thiocyano esters and ethers caused 85 to 90% of the leaves to drop from the cotton plants. As has been mentioned, the soy bean plants were still growing vigorously and had not reached maturity when the experiments were performed on them. Under such adverse conditions, the percentage of leaf drop is always very poor. Other experiments have been performed on mature soy bean plants using between 0.10 to 0.82 gallon of the thiocyano ester and ether per acre of plans in a paraffinic distillate boiling in the range of 300° to 500° F. and having an unsulfonatable residue of about 90%. This base oil, containing the thiocyano ester or ether, was applied to the soy beans at the rate of 20 gallons per acre and caused a leaf kill varying between 95 to 98% and a leaf drop varying between 85 to 98%.

When defoliating cotton it is of utmost importance that the cotton not be stained during the treatment which causes its defoliation. A number of experiments were performed which showed that the liquid hydrocarbon carrier should have a boiling range between about 300° to 500° F. in order to avoid staining of the cotton. The limitation on boiling range does not apply when defoliating other plants such as soy beans, potatoes, and the like, since the bothersome problem of staining is not present.

A number of experiments were conducted to determine the effectiveness of small amounts of the thiocyano esters and ethers in drying up or killing the foliage of soy bean plants. The experiments were conducted in a field-testing program wherein mature soy bean plants of the Hawkeye variety were treated in approximately the same manner as previously related except that 2 gallons of the base oil (containing the thiocyano ester or ether) were applied per acre of plants. The base oil was a light catalytic cycle oil having an initial boiling point of 420° F., a 10% point of 446° F., a 50% point of 482° F., a 90% point of 536° F., and an end point of 573° F. The thiocyano ester used was isobornyl thiocyanoacetate. The thiocyano ether employed was beta-butoxy-beta'-thiocyanodiethyl ether. The thiocyano compound was contained in the oil at a concentration varying between 2% to 4.2% by volume, so that upon the application of the oil at the rate of 2 gallons per acre, the amount thiocyano compound applied varied between 0.04 to 0.082 gallon per acre. The percentage of leaves killed by the treatment was measured 10 days after the application, and the percentage of brown bean pods was measured 17 days after the treatment. The results obtained are shown in Table II which follows.

*Table II*

| Experiment No. | Treatment | Am't thiocyano compound, gal./acre | Percent Soybean Leaf Kill (10 days after treatment) | Percent Brown Bean Pods (17 days after treatment) |
|---|---|---|---|---|
| 5 | none | none | 20 | 27 |
| 6 | Base Oil+thiocyano ether | 0.04 | 50 | 42 |
| 7 | Base Oil+thiocyano ether | 0.05 | 97 | 80 |
| 8 | Base Oil+thiocyano ester | 0.082 | 70 | 27 |

The above data point up the effectiveness of very small amounts of thiocyano esters and ethers in killing soy bean foliage. As little as 0.05 gallon of the thiocyano ether per acre of soy bean plants causes necrosis of 97% of the soy bean leaves. The use of such small amounts of the thiocyano ester or ether in the base oil effects a considerable saving in the cost of defoliation. The data also show that the ripening of beam pods is hastened. Application of the thiocyano ether as in Experiment No. 7 results in approximately a three-fold increase in the percentage of browned or ripened bean pods obtained over that percentage ripened on the same day on plants which had not been treated. It is thus possible to increase the crop yields per acre. The destructive effects of frost on tomato plants and other plants whose fruit is susceptible to such damage may be minimized or eliminated by defoliating the plants in accordance with this invention and hastening the ripening of their fruits.

The foliage of potato plants was effectively killed by application thereto of 0.05 to 0.082 gallon per acre of the thiocyano ester and ether. These tests demonstrated that the thiocyano compounds were superior to a similar amount of pentachlorophenol, a commercially available defoliant. Other experiments demonstrated the effectiveness of beta-beta'-dithiocyanodiethyl ether as a defoliant.

Thus having described this invention what is claimed is:

1. The method of defoliating crop bearing plants which comprises applying an organic thiocyano compound selected from the group consisting of beta-butoxy-beta'-thiocyanodiethyl ether, beta-beta'-dithiocyanodiethyl ether, isobornyl-thiocyano acetate, and mixtures thereof to the leaves of a plant having a crop at least nearing maturity, said organic thiocyano compound being applied at the rate from 0.001 to 5 gallons per acre of plants and in an amount effective to cause defoliation of said plants.

2. The method of claim 1 in which the organic thiocyano compound is beta-butoxy-beta'-thiocyanodiethyl ether which is applied as a mixture in a mineral oil carrier.

3. The method of claim 1 in which the organic thiocyano compound is applied as a mixture in a mineral oil boiling within the range of about 300 to 500° F. and having an unsulfonatable residue of more than 80%, and the mixture of thiocyano compound in the defined mineral oil is applied to the leaves of approximately mature cotton plants at the rate of about 1 to 30 gallons of mixture per acre of plants.

References Cited in the file of this patent

UNITED STATES PATENTS

| 2,289,064 | O'Kane | July 7, 1942 |
| 2,430,332 | Guy et al. | Nov. 4, 1947 |
| 2,608,479 | Boyd et al. | Aug. 26, 1952 |
| 2,615,803 | Yowell et al. | Oct. 28, 1952 |
| 2,710,794 | Barnsley | June 14, 1955 |

FOREIGN PATENTS

| 156,850 | Australia | June 3, 1954 |

OTHER REFERENCES

Ahlgren et al., "Principles of Weed Control," 1951, page 275.

Wilcoxson et al., in "Contributions from Boyce Thompson Institute," vol. 7, 1935, pp. 29–36.

Hartzell et al., in "Contributions from Boyce Thompson Institute," vol. 6, 1934, pp. 269–277.

UNITED STATES PATENT OFFICE

CERTIFICATE OF CORRECTION

Patent No. 2,903,347 September 8, 1959

Loyd Q. Boyd

It is hereby certified that error appears in the printed specification of the above numbered patent requiring correction and that the said Letters Patent should read as corrected below.

Column 1, line 56, for "died" read -- dried --; column 3, line 2, for "distallates" read -- distillates --; line 10, for "or more" read -- of more --; line 12, for "defolation" read -- defoliation --.

Signed and sealed this 1st day of March 1960.

(SEAL)
Attest:

KARL H. AXLINE
Attesting Officer

ROBERT C. WATSON
Commissioner of Patents